United States Patent
Lee et al.

(10) Patent No.: US 9,454,222 B1
(45) Date of Patent: Sep. 27, 2016

(54) DEVICE FOR OBJECT MANIPULATING WITH MULTI-INPUT SOURCES

(75) Inventors: Hyun Jeong Lee, Yongin-si (KR); Seung Ju Han, Yongin-si (KR); Joon Ah Park, Yongin-si (KR); Wook Chang, Yongin-si (KR); Jeong Hwan Ahn, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1278 days.

(21) Appl. No.: 13/147,069

(22) PCT Filed: Jan. 29, 2010

(86) PCT No.: PCT/KR2010/000571
§ 371 (c)(1),
(2), (4) Date: Jan. 4, 2012

(87) PCT Pub. No.: WO2010/087654
PCT Pub. Date: Aug. 5, 2010

(30) Foreign Application Priority Data

Jan. 29, 2009 (KR) .................. 10-2009-0007181
Jan. 29, 2009 (KR) .................. 10-2009-0007182
Jan. 28, 2010 (KR) .................. 10-2010-0008110

(51) Int. Cl.
*G06G 7/48* (2006.01)
*G06F 3/01* (2006.01)

(52) U.S. Cl.
CPC .............. *G06F 3/011* (2013.01); *G06F 3/017* (2013.01)

(58) Field of Classification Search
CPC ........ G06F 3/011; G06F 3/017; G06T 15/00; G06T 15/08; G06T 19/00; G06T 19/08; G06T 19/20; G06T 13/40
USPC ........................................................ 703/6
See application file for complete search history.

(56) References Cited

U.S. PATENT DOCUMENTS

| 6,088,017 | A * | 7/2000 | Tremblay et al. ............ 345/156 |
| 8,060,251 | B2 * | 11/2011 | Gonzalez-Banos et al. . 700/246 |
| 2005/0187015 | A1 | 8/2005 | Suzuki et al. |
| 2006/0250401 | A1 | 11/2006 | Pannese et al. |
| 2008/0081701 | A1 | 4/2008 | Shuster |
| 2009/0066690 | A1* | 3/2009 | Harrison ....................... 345/419 |

FOREIGN PATENT DOCUMENTS

| KR | 10-0571832 | 4/2006 |
| KR | 10-2006-0040704 | 5/2006 |
| WO | WO 2005/109122 | 11/2005 |

OTHER PUBLICATIONS

International Search Report, mailed Sep. 14, 2010, in International Application No. PCT/KR2010/000571.
Form PCT/ISA/237, mailed Sep. 14, 2010, in International Application No. PCT/KR2010/000571.
Extended European Search Report issued Jun. 28, 2013 in corresponding European Application No. 10736045.5.

(Continued)

*Primary Examiner* — Kamini S Shah
*Assistant Examiner* — Andre Pierre Louis
(74) *Attorney, Agent, or Firm* — NSIP Law

(57) ABSTRACT

An object manipulation apparatus and method model an object for manipulation of a virtual object, suggest object operation schema, define a physical and mental condition of an avatar, and set motion data of the avatar.

3 Claims, 41 Drawing Sheets

(56) References Cited

OTHER PUBLICATIONS

Ivan E. Sutherland, "Sketchpad a Man-Machine Graphical Communication System", Proceedings of the Spring Joint Computer Conference, 1963, pp. 329-346.

Summons to Attend Oral Proceedings issued on Dec. 3, 2015 in counterpart European Application No. 10736045.5 (11 pages in English).

* cited by examiner

FIG. 15

| Name | Definition | | |
|---|---|---|---|
| ObjectID | This element describes the unique identities to provide the controlling software with the ability to recognize and distinguish between objects. | | |
| ObjectState | This element describes the current state, that is, available, selected, and unavailable. | | |
| | Type of ObjectState | Description | |
| | 0 | Available | |
| | 1 | Selected | |
| | 2 | Unavailable | |
| | 3 ~ 255 | Reserved | |
| ModifiableAttributes | To access information about the particulars of attributes when these attributes are subject to modification by the user. | | |
| | Type of ModifiableAttributes | Description | |
| | 0 | Available | |
| | 1 | Unavailable | |
| | 2 ~ 255 | Reserved | |

FIG. 17

| Name | Definition |
|---|---|
| SpatialAttributes | All objects involve the spatial attributes of: shape, location, and size. Each of these attributes also exists for visual/graphic forms of interaction. |
| PhysicalAttributes | Physical attributes that may be used for coding include: texture, pressure/force, vibration, and temperature. Each of these physical attributes may or may not be present in objects. To provide realism. |
| TemporalAttributes | There are many temporal aspects that may be involved in a haptic interface. Temporal attributes used for coding include: duration and motion. |
| Combinations | Combinations of spatial, physical, and temporal attributes can be used: To encode different types of information, or in combination together to determine the unique encoding of a single piece of information |

FIG. 18

| | |
|---|---|
| Diagram | om:SpatialAttributesType<br>SpatialAttributes → Shape / Location / Size |
| Children | `<Shape> <Location> <Size>` |
| Source | `<element name="SpatialAttributes" type="om:SpatialAttributesType"/>`<br>`<complexType name=" SpatialAttributesType ">`<br>  `<sequence>`<br>    `<element name="Shape " type="om:ShapeType"/>`<br>    `<element name="Location " type="om:LocationType"/>`<br>    `<element name="Size " type="om:SizeType"/>`<br>  `</sequence>`<br>`</complexType>` |

| Name | Definition |
|---|---|
| Shape | Simple shapes (cubic, sphere, cylinder, cone) + Complex shapes |
| Location | This describes the object position in virtual space and its format is a point (x, y, z). |
| Size | This describes the length, width, height of object. |

| | |
|---|---|
| Diagram | om:PhysicalAttributesType<br>PhysicalAttributes → Tactile / Pressure/Force / Vibration / Temperature |
| Children | `<Tactile> <Pressure/Force> <Vibration> <Temperature>` |
| Source | `<element name="PhysicalAttributes" type="om:PhysicalAttributesType"/>`<br>`<complexType name=" PhysicalAttributesType ">`<br>  `<sequence>`<br>    `<element name="Tactile " type="om:TactileType"/>`<br>    `<element name="Pressure/Force " type="om:Pressure/ForceType"/>`<br>    `<element name="Vibration " type="om:VibrationType"/>`<br>    `<element name="Temperature " type="om:TemperatureType"/>`<br>  `</sequence>`<br>`</complexType>` |

FIG. 19

| Name | Definition |
|---|---|
| Tactile | This describes how smooth or rough the object is |
| Pressure/Force | This is force that avatar produce when he press hard on the object. |
| Vibration | This describes the degree of object's shaking with repeated small, quick movements. |
| Temperature | That of object is a measure of how hot or cold it is |

FIG. 21

| Name | Definition |
|---|---|
| Duration | This should be directly related to its relevance to the real time scenario in which it is used. |
| Motion | This element involves changes in location and/or other spatial and/or physical attributes over time. |

FIG. 23

| Name | Definition |
|---|---|
| ObjectSelection | It is considered a separate operation in this model for recognition. |
| ObjectManipulation | To manipulate objects. |

FIG. 25

| Name | Definition |
|---|---|
| ObtainTargetInfo | This element allows a user to find out about the object. It involves determining the desired target object attributes. |
| ModifyAttributes | To modify the attributes of the objects |
| Remove/RestoreObject | To remove or restore the attributes of object |

FIG. 29

| Name | Definition |
|---|---|
| VE | This element describes all elements in the virtual world |
| Avatar | Avatar is one element of virtual elements and represents an other self of user in the virtual space. |

FIG. 31

| Name | Definition |
|---|---|
| AvatarIdentifier | This element describes the information of avatar identification. |
| MotionData | This element describes the information of the motion assigned to an avatar. |
| AvatarCondition | This elements is conditions of an avatar and contains PhysicalCondition and MentalCondition. |

FIG. 33

| Name | Definition |
|---|---|
| AvatarID | This attribute describes the ID of the avatar. |
| TypeOfAvatar | This attribute contains the enumeration set of Avatar type.<br><br>| TypeOfAvatar | Description |<br>|---|---|<br>| 0 | Reserved |<br>| 1 | Human |<br>| 2 | Animal with 4 legs |<br>| 3 | Bird |<br>| 4 | Robot with wheels |<br>| 5~255 | Reserved | |
| Gender | This describes the gender of the avatar and is this value is M or F. |
| Position | This describes the avatar position in virtual space and its format is a point (x, y, z). |
| Orientation | This describes the avatar orientation in virtual space and its format is an angle(⊕x, ⊖y ⊖z). |

FIG. 35

| Name | Definition |
|---|---|
| MotionState | This describes the activation of the motion. {on, off} |
| MotionID | This describes the MotionID assigned to the avatar. |
| RangeOfMotion | This describes the permissible range in percentage (0%~100%). |

FIG. 37

| Name | Definition | | |
|---|---|---|---|
| PhysicalCondition | This describes the physical body information of the avatar. It can have multiple SpecialState values. | | |
| MentalCondition | This describes the mental state of the avatar. It can have multiple TypeOfMental values and SpecialState values | | |
| TypeOfPause | This describes the information of the avatar's holistic body pause. | | |
| | TypeOfPause | Description | |
| | 0 | Reserved | |
| | 1 | Standing | |
| | 2 | Sitting on the chair | |
| | 3 | Sitting on the ground | |
| | 4. | Lying | |
| | 5 | Lying on its stomach. | |
| | 6~256 | Reserved | |
| LevelOfBodyStrength | This describes the body strength of the avatar. | | |
| | LevelOfBodyStrenth | Description | |
| | -3 | The weakest level | |
| | -2 | ... | |
| | ... | ... | |
| | 2 | ... | |
| | 3 | The strongest level | |
| Specialstate₁ | This describes physically special states of the avatar. Ex) having a luggage, wounded | | |
| Appearance | This describes the appearance of the avatar including cloth, ornament, height/weight of the avatar and so on. It can have multiple ornamentID values and ClothID values. | | |

| | | | |
|---|---|---|---|
| TypeOfMental | This describes the mental state type of the avatar... | | |
| | TypeOfMental | Description | |
| | 0 | Reserved | |
| | 1 | Nothing | |
| | 2 | Laugh | |
| | 3 | Sadness | |
| | 4. | Crying | |
| | 5 | Happy | |
| | 6~256 | Reserved | |
| LevelOfMental | This describes the level of avatar mental condition. (1~10) the larger value means significant state. | | |
| SpecialState₂ | This describes mentally special sates of avatar including melancholia, deaths and so on. | | |
| OrnamentID | This describes the ornaments which the avatar puts on | | |
| ClothID | This describes the clothes which the avatar puts on | | |
| Weight | This attribute is a member of Avatar and describes the weight of an Avatar (0~Unbounded kg). | | |
| Height | This attribute is a member of Avatar and describes the height of an Avatar (0~Unbounded cm). | | |

FIG. 39

| Name | Definition |
|---|---|
| Navigation | This describes the information of a Navigation Control. |
| NavigaionControlData | This describes the information to control navigations. |

FIG. 41

| Value | Definition |
|---|---|
| MoveState | This describes the activated state of the motion.<br><br>| MoveState | Description |<br>|---|---|<br>| 0 | Reserved |<br>| 1 | Nothing |<br>| 2 | Walking or Driving |<br>| 3 | Flying |<br>| 4. | Swimming |<br>| 6~256 | Reserved | |
| NavigationVector | This describes the 3D direction information of the navigation in the virtual space. {Θx, Θy Θz} |
| TypeOFDirection | This describes the direction type information. If it has the "free direction" value, navigation direction is determined by NavigationVector value.<br><br>| TypeOFDirection | Description |<br>|---|---|<br>| 0 | Reserved |<br>| 1 | Forward |<br>| 2 | Backward |<br>| 3 | Going right direction |<br>| 4. | Going left direction |<br>| 5 | Free |<br>| 6 | Turning right |<br>| 7 | Turning left |<br>| 8~256 | Reserved | |
| Speed | This describes the speed of navigation(m/s) |
| RefMotionID | This describes the motion information simultaneously with navigation. |

DEVICE FOR OBJECT MANIPULATING WITH MULTI-INPUT SOURCES

CROSS-REFERENCE TO RELATED APPLICATIONS

This application is a national phase application, under 35 U.S.C. 371, of international application No. PCT/KR2010/000571, filed on Jan. 29, 2010, which claimed priority to Korean Patent Application No. 10-2009-0007181, filed on Jan. 29, 2009, Korean Patent Application No. 10-2009-0007182, filed on Jan. 29, 2009 and Korean Patent Application No. 10-2010-0008110, filed on Jan. 28, 2010 the disclosures of which are incorporated herein by reference.

BACKGROUND

1. Field

The present invention relates to a method for modeling a structure of a virtual object and also modeling an avatar in a virtual world.

2. Description of the Related Art

Recent research has rapidly increased interest of users in interaction between a human and a computer. A virtual reality (VR) technology is being developed and applied in various fields, particularly, in the entertainment field. The entertainment field is commercialized, for example, in the form of 3-dimensional (3D) virtual online community such as SECOND LIFE and a 3D game station. The 3D game station offers an innovative gaming experience through a 3D input device. A sensor-based multi-modal interface may be applied to a VR system to achieve control of a complicated 3D virtual world. Here, a connection between the real world and the virtual world may be achieved by a virtual to real-representation of sensory effect (VR-RoSE) engine and a real to virtual-RoSE (RV-RoSE) engine.

Corresponding to development of the VR technology, there is a need for a method of more effectively reflecting motion in the real world for manipulation of an object of the virtual world and navigating an avatar in the virtual world.

SUMMARY

Additional aspects and/or advantages will be set forth in part in the description which follows and, in part, will be apparent from the description, or may be learned by practice of the invention.

According to an aspect, there is provided an object manipulation device including an object modeling unit to set a structure of a virtual object, and an object operating unit to select the virtual object and control an object operation of the selected virtual object.

The virtual object may include at least one of general information on the virtual object, an object identifier for identification of the virtual object in a virtual world, and object attributes including at least one attribute of the virtual object.

The object identifier may include at least one of an object ID allocated to the virtual object, an object state for recognition of a state of the virtual object, and modifiable attributes for determining modifiability of attributes of the virtual object.

The object attributes may include at least one of spatial attributes, physical attributes, temporal attributes, and combinational attributes.

The spatial attributes may include at least one of a shape, a location, and a size of the virtual object. The physical attributes may include at least one of a tactile sensation, a pressure, a vibration, and a temperature of the virtual object, and the temporal attributes may include at least one of a duration and a motion of the virtual object.

The object operating unit may control at least one performance of selection of the virtual object, collection of object attributes of the virtual object, modification of the object attributes of the virtual object, and removal and storing of the object attributes of the virtual object.

The object manipulation device may include an avatar structure setting unit to set a structure of an avatar, and an avatar navigation unit to control a motion of the avatar corresponding to a motion of a user in a real world.

The avatar structure setting unit may include an avatar identifying unit to set information for identifying the avatar, an avatar condition managing unit to set a physical condition and a mental condition of the avatar, and a motion managing unit to manage the motion of the avatar.

The avatar navigation unit may include a general information managing unit to manage general information of the avatar, and a control data managing unit to control the motion of the avatar.

The control data managing unit may manage at least one of a movement state, a movement direction, and a speed of the avatar.

According to one embodiment, there is provided an object manipulation apparatus and method capable of modeling an object for manipulation of a virtual object and effectively reflecting a motion of a real world to manipulation of an object of a virtual world.

According to one embodiment, there is provided an object manipulation apparatus and method capable of effectively navigating an avatar in a virtual world by determining a physical and mental condition of the avatar and setting motion data of the avatar.

BRIEF DESCRIPTION OF THE DRAWINGS

These and/or other aspects and advantages will become apparent and more readily appreciated from the following description of the embodiments, taken in conjunction with the accompanying drawings of which:

FIG. 15 illustrates Semantic, according to an example embodiment;

FIG. 17 illustrates Semantic, according to an example embodiment;

FIG. 18 illustrates Syntax, according to an example embodiment;

FIG. 19 illustrates Semantic, according to an example embodiment;

FIG. 21 illustrates Semantic, according to an example embodiment;

FIG. 23 illustrates Semantic, according to an example embodiment;

FIG. 25 illustrates Semantic, according to an example embodiment;

FIG. 29 illustrates Semantics, according to an example embodiment;

FIG. 31 illustrates Semantics, according to an example embodiment;

FIG. 33 illustrates Semantics, according to an example embodiment;

FIG. 35 illustrates Semantics, according to an example embodiment;

FIG. 37 illustrates Semantics, according to an example embodiment;

FIG. 39 illustrates Semantics, according to an example embodiment;

FIG. 41 illustrates Semantics, according to an example embodiment.

DETAILED DESCRIPTION

Figure 1:
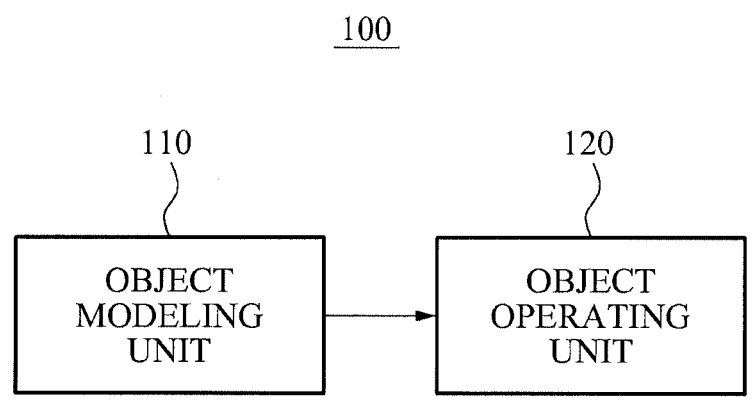
FIG. 1 illustrates a block diagram of an object manipulation apparatus according to an embodiment.

Reference will now be made in detail to embodiments, examples of which are illustrated in the accompanying drawings, wherein like reference numerals refer to like elements throughout. The embodiments are described below in order to explain the present invention by referring to the figures.

FIG. 1 illustrates a block diagram of an object manipulation apparatus 100 according to an embodiment.

Referring to FIG. 1, the object manipulation apparatus 100 may include an object modeling unit 110 to set a structure of a virtual object, and an object operating unit 120 to select the virtual object and control an object operation of the selected virtual object. Here, the object modeling refers to a process of defining an object model that includes an identifier and attributes for manipulation of the virtual object.

Figure 2:
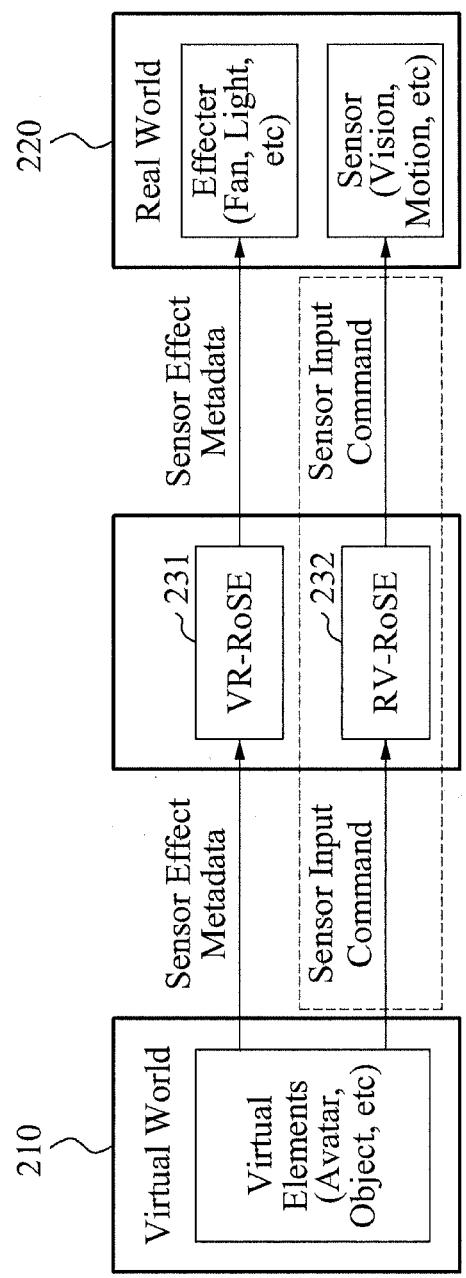
FIG. 2 illustrates a diagram of a system connecting a virtual world with a real world, according to an example embodiment.

FIG. 2 illustrates a diagram of a system connecting a virtual world with a real world, according to an example embodiment. That is, FIG. 2 shows system architecture of sensor input metadata and virtual element metadata. A connection between a real world 220 and a virtual world 210 may be achieved via a virtual to real-representation of sensory effect (VR-RoSE) engine 231 and a virtual to real-representation of sensory effect (RV-RoSE) engine 232. Here, the virtual element metadata refers to metadata related to structures of objects and avatars present in a virtual space. The sensor input metadata refers to metadata for a control function such as navigation and manipulation of the avatars and the objects in a multimodal input device. The object modeling and the object operation will be described in further detail. The object modeling relates to the sensor input metadata while the object operation relates to a sensor input command.

<Object Modeling (OM)>

The OM including the identifier and the attributes may be defined for manipulation of the virtual object. Objects in the virtual world 210 have a particular identifier for controlling software capable of discriminating the objects. In addition, all the objects may include spatial, physical, and temporal attributes to provide reality. Hereinafter, an example of the object modeling will be described with reference to FIG. 3.

Figure 3:
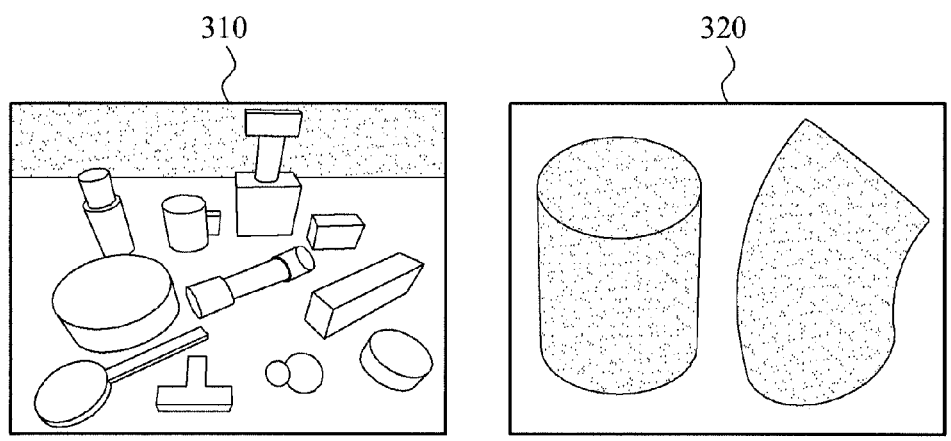
FIG. 3 illustrates a diagram describing an object modeling operation according to an example embodiment.

FIG. 3 illustrates a diagram describing an object modeling operation according to an example embodiment.

FIG. 3 shows an object 310 having a predetermined shape and an object 320 having a predetermined tactile sensation. The object modeling may define shape attributes and tactile attributes of the objects.

The virtual world may provide a selection effect and a manipulation effect. Variables related to the effects may include a size, a shape, a tactile sensation, a density, a motion, and the like.

Figure 11:
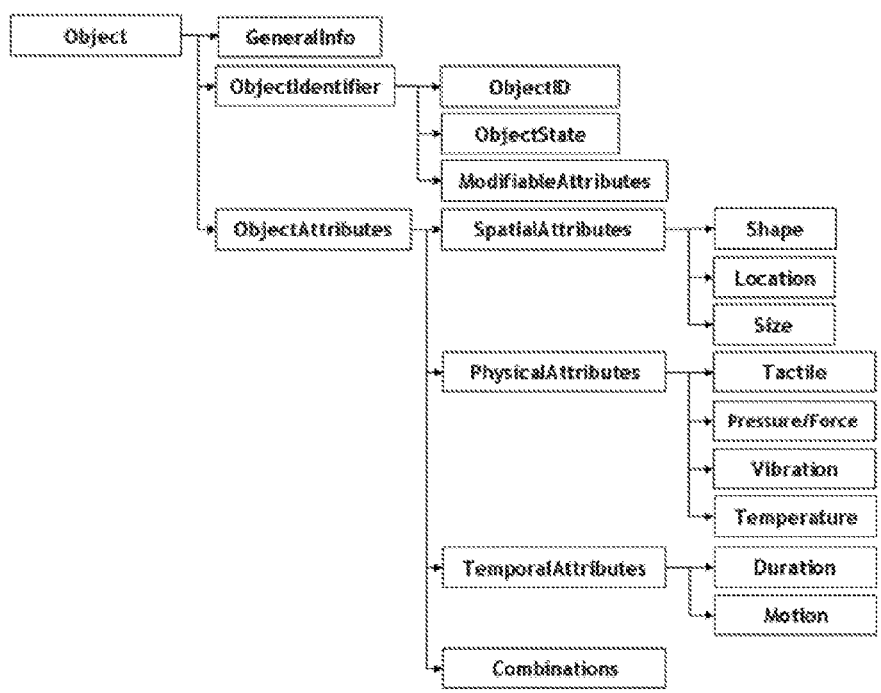
FIG. 11 illustrates a hierarchical diagram of an object modeling for a selection and a manipulation, according to an example embodiment.

A hierarchical diagram of the object modeling for the selection and the manipulation is shown in FIG. 11.

The object may include general information, an object identifier, and object attributes. The general information may contain an overall description of the object.

The object identifier is used for discrimination of the object in the virtual world. The object identifier may include an object ID, an object state indicating a present state by selected, selectable, and unselectable modes, and modifiable attributes indicating modifiability of the attributes.

The object attributes may include spatial attributes such as a shape, a location, and a size, physical attributes such as a tactile sensation, a pressure or force, a vibration, and a temperature, temporal attributes such as a duration and a motion, and combinational attributes including a combination of the aforementioned attributes.

<Object Operation (OO)>

The object operation may include collection of information through an interface, modification of the object attributes, and removal and restoration of the object. Hereinafter, an example object operation will be described with reference to FIG. 4.

Figure 4:
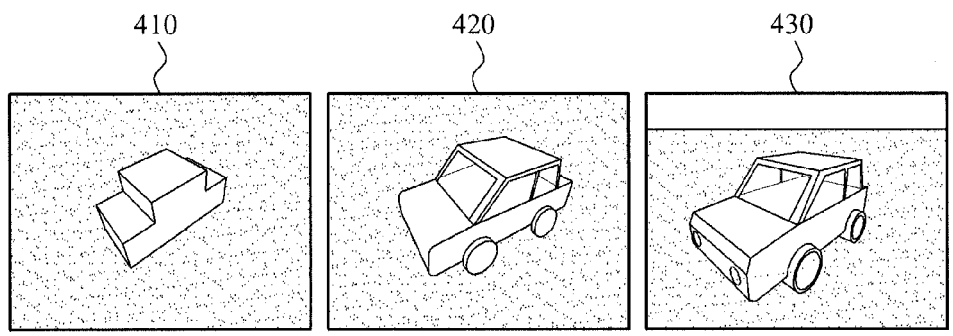
FIG. 4 illustrates a diagram describing an object operation model according to an example embodiment.

FIG. 4 illustrates a diagram describing an OO model according to an example embodiment.

FIG. 4 illustrates a process of generating a virtual car. The virtual car may be generated by using initial models and revising sizes, locations, and shapes of the initial models. That is, the virtual car may be generated as desired by revising the sizes, locations, and shapes of the initial models through sequential operations 410, 420, and 430.

Reality may be provided to the virtual object according to a weight, a roughness, and the like of the virtual object.

Figure 5:
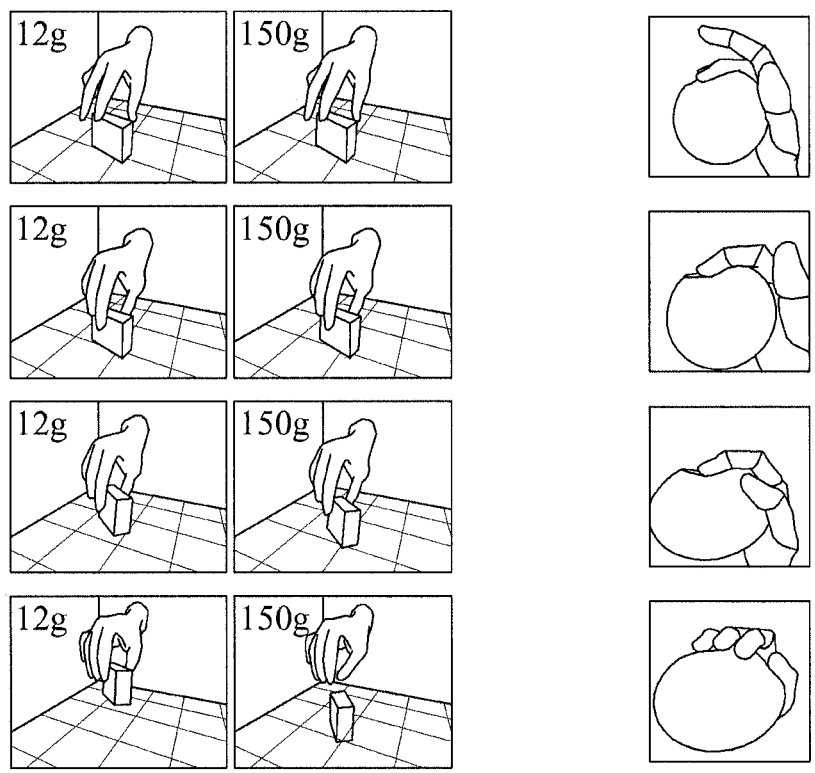
FIG. 5 illustrates a diagram describing an object operation model according to another example embodiment.

For example, FIG. 5 shows various states of a hand grasping boxes of various weights. That is, with respect to objects having the same shape, various motions may be expressed according to weights, masses, and the like. FIG. 5 also shows various deformed states of a rubber ball being grasped by a hand. That is, the object may be deformed according to forces, pressures, and the like applied to the object.

Figure 12:
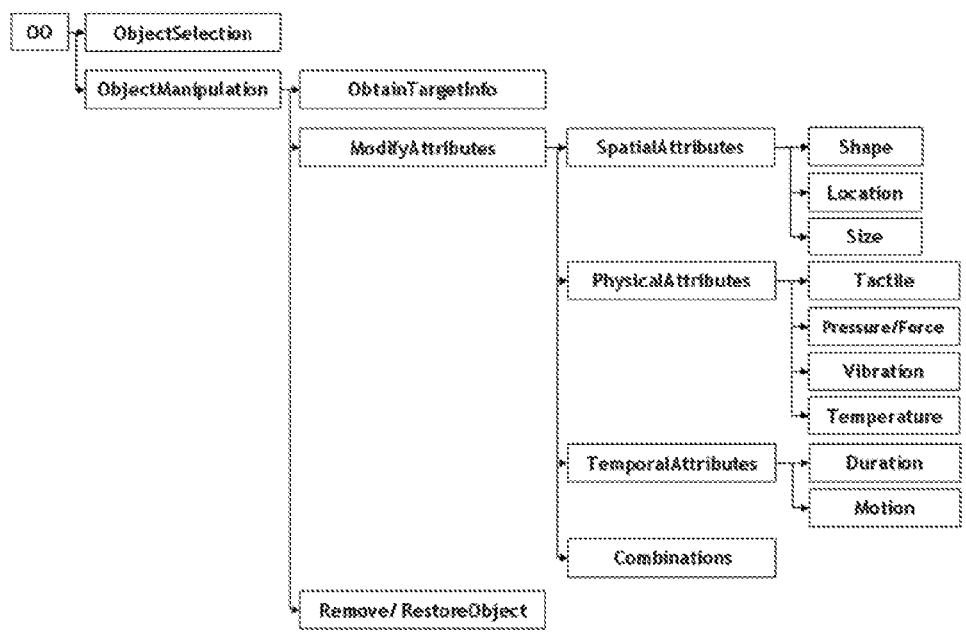
FIG. 12 illustrates a hierarchical diagram of OO, according to an example embodiment.

A hierarchical diagram of the OO, referred to in FIG. 12, will be described in further detail below.

The OO may include object selection to select an object desired to be deformed by a user, and object manipulation to modify the attributes of the selected object. The object manipulation may perform at least one of collection of object attributes of the virtual object, modification of the object attributes of the virtual object, removal and storing of the object attributes of the virtual object. Accordingly, the object manipulation may include ObtainTargetInfo to obtain an ID of the selected object and existing attributes, ModifyAttributes to modify the object attributes, and Remove/RestoreObject to remove or restore the object attributes.

Hereinafter, the system architecture for the object manipulation will be described.

The object manipulation may include operations of selecting a target object according to a user preference, extracting the object attributes of the selected object, modifying the extracted object attributes, storing the modified object attributes, and releasing the object.

Figure 6:
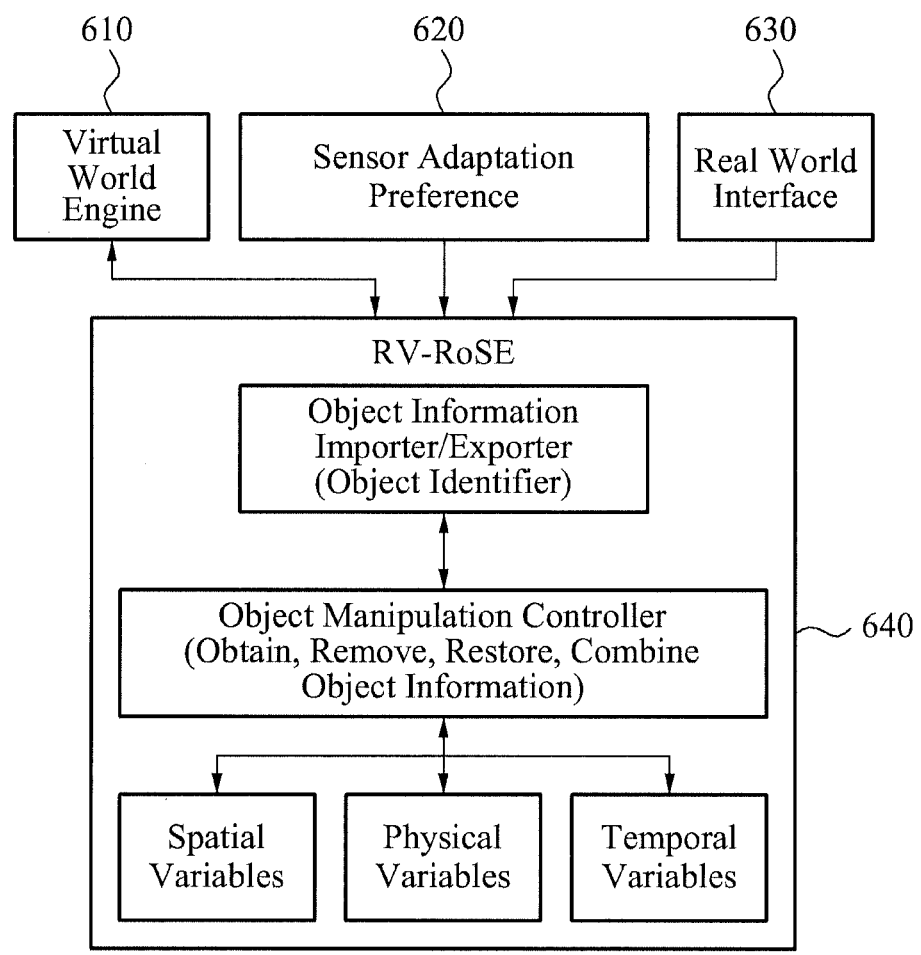
FIG. 6 illustrates a diagram describing a process of manipulating an object associated with a real to virtual-representation of sensory effect (RV-RoSE) engine according to an example embodiment.

FIG. 6 illustrates a diagram describing object manipulation in association with an RV-RoSE engine according to an example embodiment.

Referring to FIG. 6, the whole system includes a virtual world engine 610, a real world interface 630, a sensor adaptation preference 620, and an RV-RoSE engine 640.

The virtual world engine 610 is a system for connecting with a virtual world such as SECOND LIFE. The real world interface 630 refers to a terminal enabling a user to control the virtual world. For example, the real world interface 630 includes a 2D/3D mouse, a keyboard, a joystick, a motion sensor, a heat sensor, a camera, a haptic glove, and the like.

The sensor adaptation preference 620 refers to a part to add an intention of the user, for example, adjustment of a range of data values.

When the user selects the virtual object through various versions of the real world interface 630, ID information of the selected virtual object may be input to an importer of the RV-RoSE engine 640. Additionally, spatial, physical, and temporal information are input to a sub object variable through an object manipulation controller. When the user modifies the object attributes through various versions of the real world interface 630, the object manipulation controller of the RV-RoSE engine 640 adjusts and stores values of corresponding variables. Next, the modified object attributes may be transmitted to the virtual world engine 610 through an object information exporter.

<Metadata Schema>

Hereinafter, metadata schema, syntax, and semantics related to the object modeling and the object operation will be described.

<ObjectModel (OM) Schema>

1. OM

The OM is a basic element of the virtual element metadata.

Figure 13:
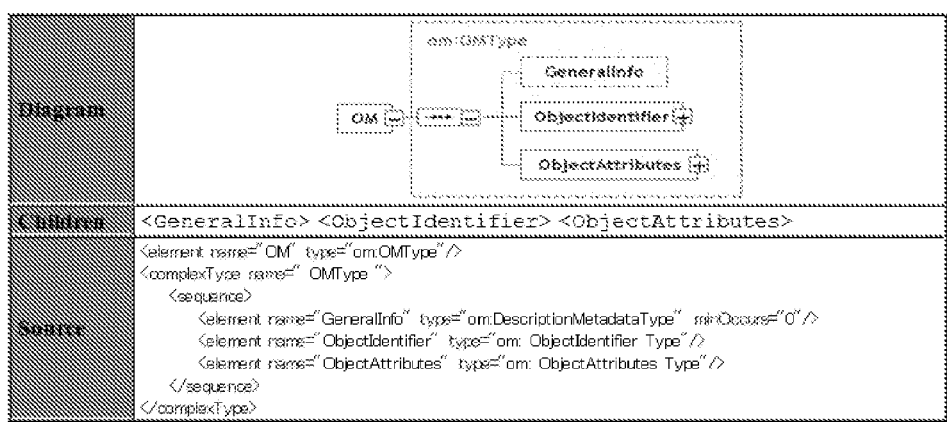
FIG. 13 illustrates Syntax, according to an example embodiment.

Syntax is shown in FIG. 13.

2. ObjectIdentifier

Figure 14:
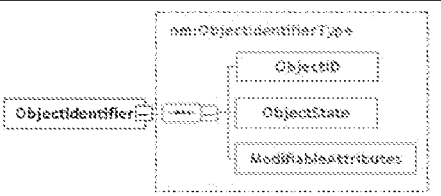
FIG. 14 illustrates Syntax, according to an example embodiment.

Syntax is shown in FIG. 14.

Semantic is shown in FIG. 15.

3. ObjectAttributes

Figure 16:
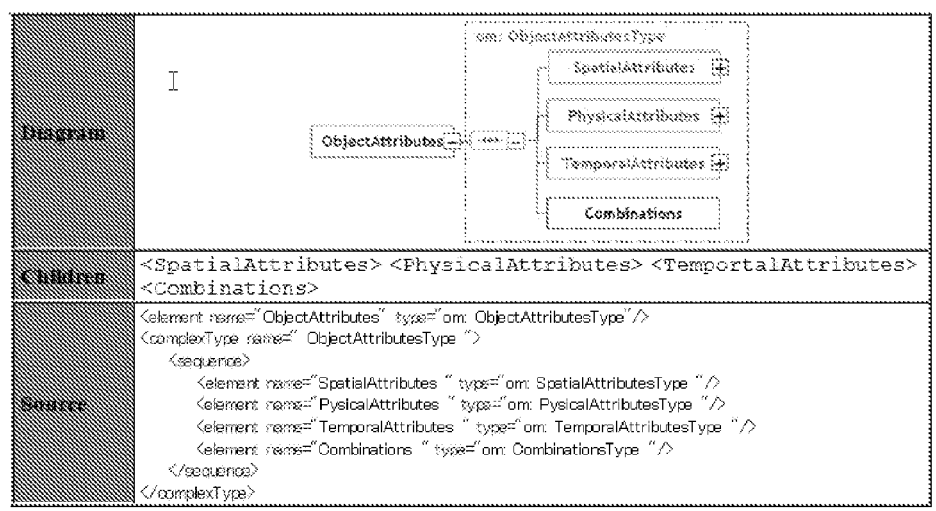
FIG. 16 illustrates Syntax, according to an example embodiment.

Syntax is shown in FIG. 16.

Semantic is shown in FIG. 17.

4. SpatialAttributes

Syntax is shown in FIG. 18.

Semantic is shown in FIG. 19.

6. TemporalAttributes

Figure 20:
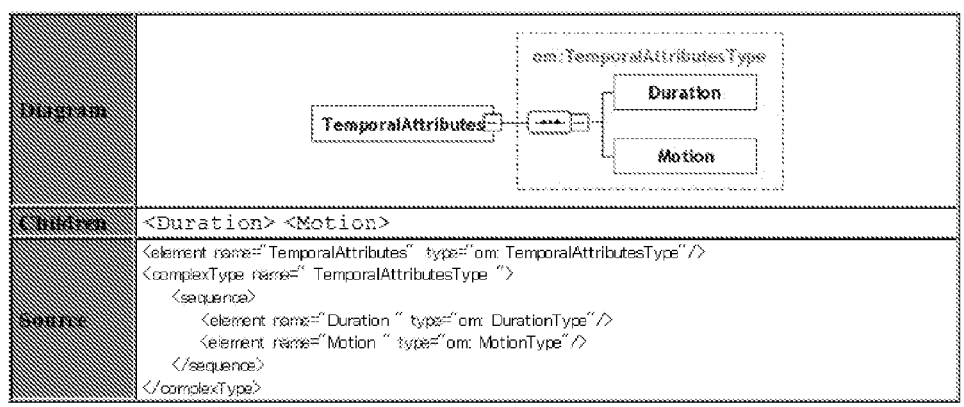
FIG. 20 illustrates Syntax, according to an example embodiment.

Syntax is shown in FIG. 20.

Semantic is shown in FIG. 21.

<ObjectOperations (OO) Schema>

1. OO

Figure 22:
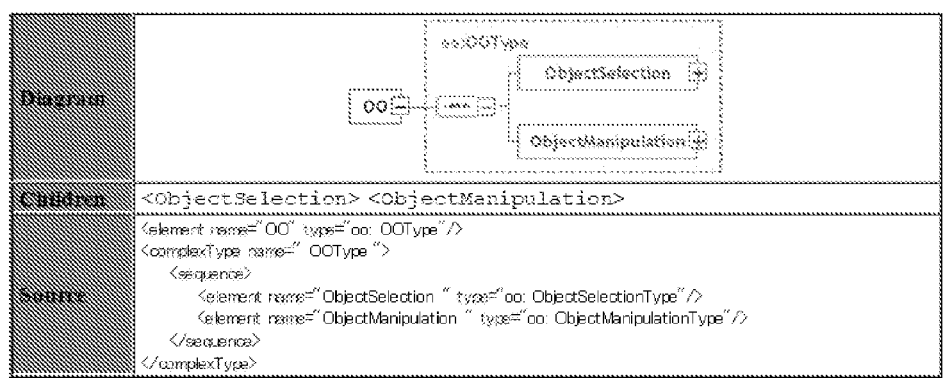
FIG. 22 illustrates Syntax, according to an example embodiment.

Syntax is shown in FIG. 22.

Semantic is shown in FIG. 23.

2. ObjectManipulation

Figure 24:
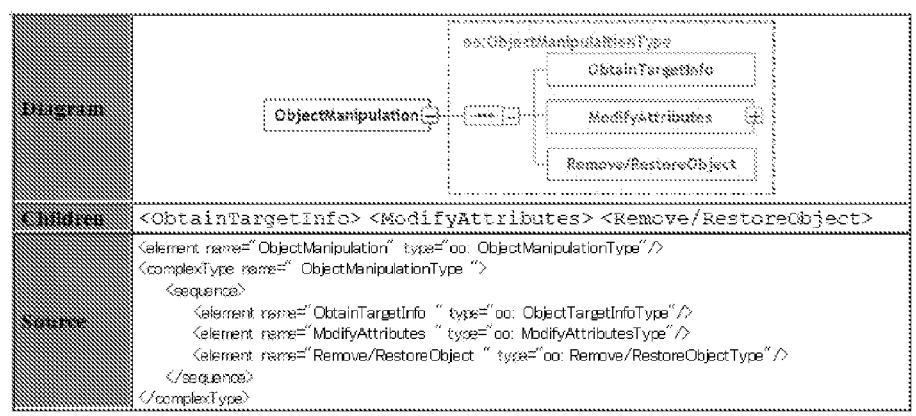
FIG. 24 illustrates Syntax, according to an example embodiment.

Syntax is shown in FIG. 24.

Semantic is shown in FIG. 25.

Figure 7:
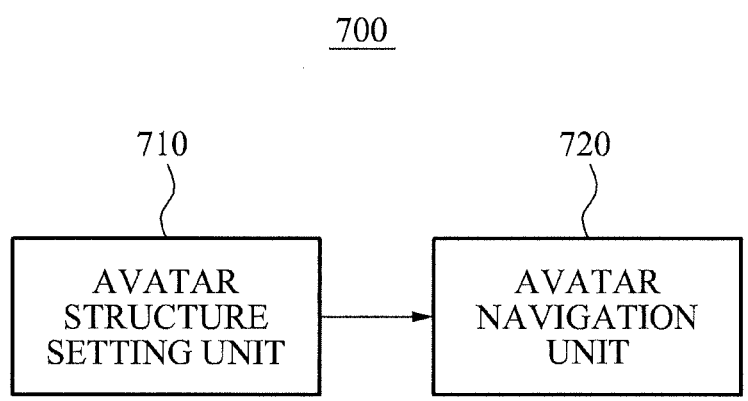
FIG. 7 illustrates a block diagram describing an object manipulation apparatus according to another example embodiment.

FIG. 7 illustrates a block diagram describing an object manipulation apparatus 700 according to another example embodiment.

Referring to FIG. 7, the object manipulation apparatus 700 includes an avatar structure setting unit 710 to set a structure of an avatar, and an avatar navigation unit 720 to control a motion of the avatar corresponding to a motion of the user of the real world. Here, the avatar structure setting may be related to the virtual element metadata whereas avatar motion control, that is, navigation control may be related to a sensor input metadata.

<Avatar>

Virtual elements may include avatars, objects, geometries, cameras, light conditions, and the like. The present embodiment will define the structure of the avatar.

An avatar represents another identity of the user. In SECOND LIFE or a 3D game, the avatar needs to have attributes including a physical condition and a mental condition since the avatar behaves in different manners according to the physical condition and the mental condition of a user. Also, motion patterns of the avatar may be varied by combining the physical condition and the mental condition. For combination of information on the physical condition and the mental condition, the avatar may include parameters related to the physical condition and the mental condition.

For example, first, AvatarCondition may be defined as a main element for the physical condition and the mental condition of the avatar. The AvatarCondition may include PhysicalCondition and MentalCondition as sub-parameters for the physical condition and the mental condition, respectively.

A countenance and a pose of the avatar may be determined by values of the AvatarCondition, which will be described in detail with reference to FIG. 8.

Figure 8:
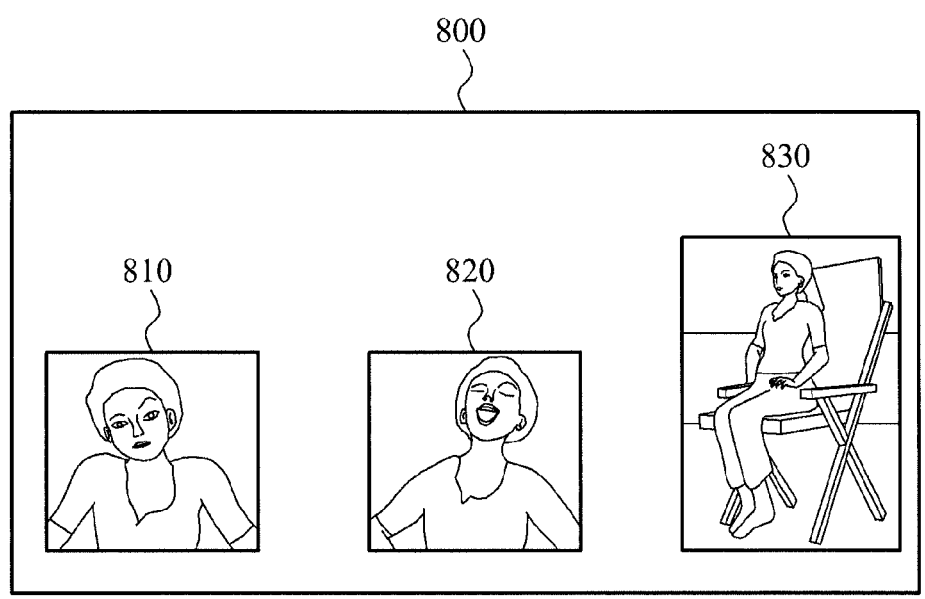
FIG. 8 illustrates a diagram showing a countenance and a pose of an avatar, which are determined by an avatar condition managing unit, according to an example embodiment.

FIG. 8 illustrates a diagram showing the countenance and the pose of the avatar, which are determined by an avatar condition managing unit, according to an example embodiment.

Referring to FIG. 8, various countenances and poses 800, such as an expressionless face 810, a happy face 820, and a sitting pose 830, may be determined according to the values of the AvatarCondition.

To generate various behavior patterns, the avatar metadata may also include AvatarMotionData. The AvatarMotionData may indicate a current motion state such as an on and off state when motion data is allocated, and a degree of reaction of the avatar with respect to the motion, such as a reaction range.

Figure 26:
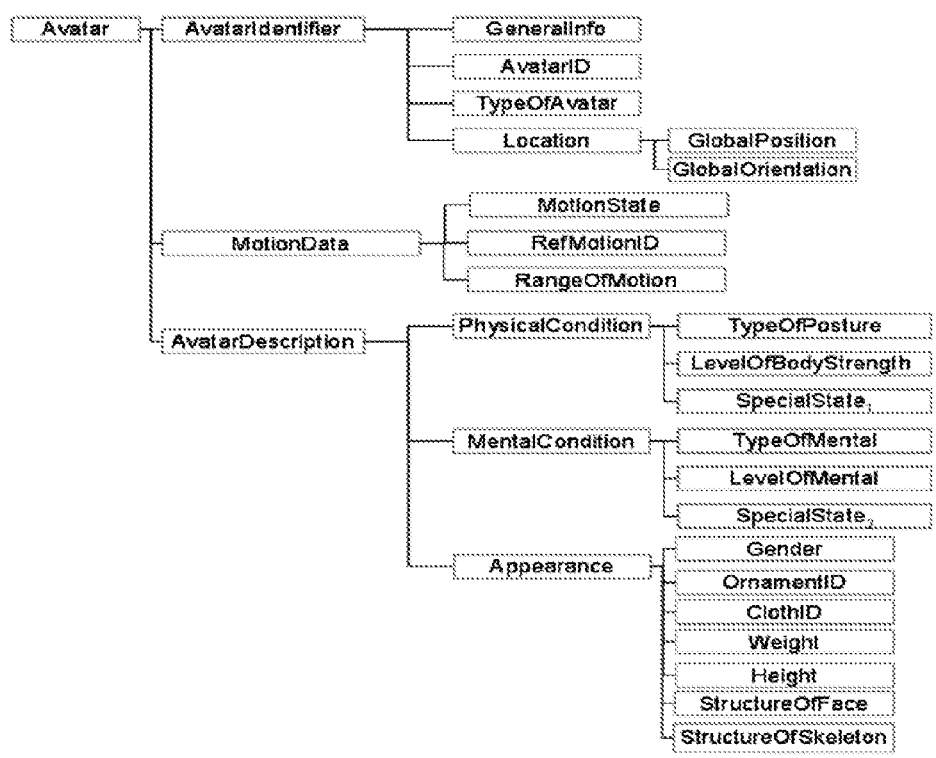
FIG. 26 illustrates a hierarchical diagram of avatar information, according to an example embodiment.

Accordingly, a hierarchical diagram of avatar information may be expressed as FIG. 26.

<Navigation Control>

Avatar navigation is a basic operation among control operations for a 3D virtual world. A multi-modal interface is capable of recognizing context information related to a user or user environments and also recognizing information necessary for the navigation. When sensor input of the multi-modal interface is systemized, the avatar navigation may be expressed in various manners.

Figure 9:
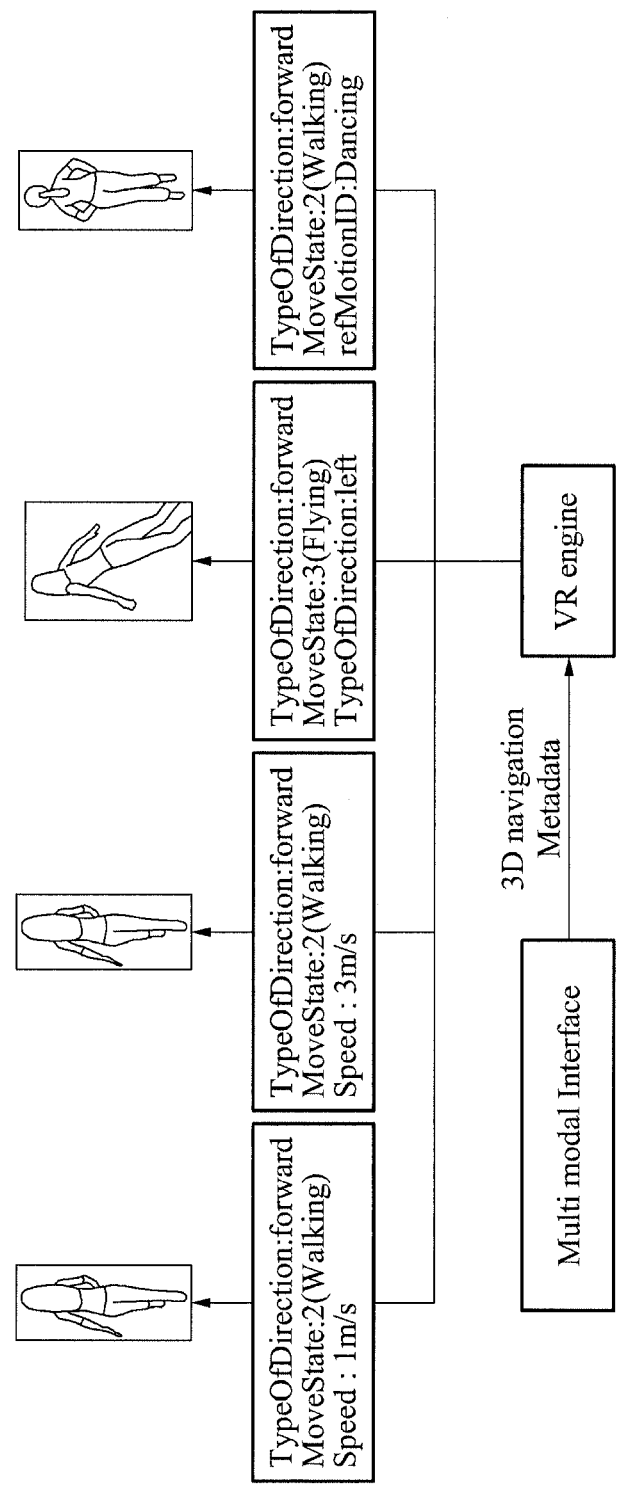
FIG. 9 illustrates a diagram describing metadata control for avatar navigation, according to an example embodiment.

FIG. 9 illustrates a diagram describing metadata control for the avatar navigation, according to an example embodiment.

Referring to FIG. 9, the avatar may use MoveState to check a motion such as walking, running, and the like. Here, walking and running may be discriminated by speed. RefMotionID provides information on which motion is simultaneously performed with the avatar navigation. In addition, various situations may be applied to be navigable using context information by the multi-modal interface.

Figure 27:
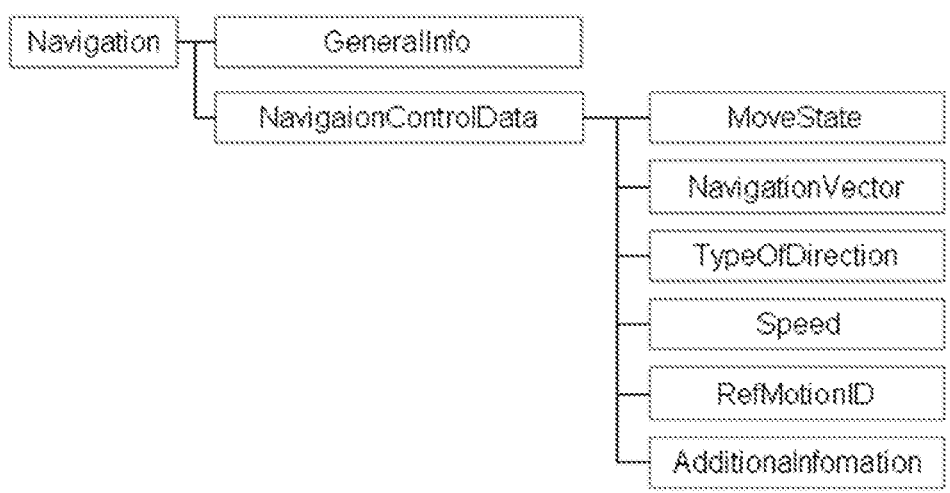
FIG. 27 illustrates a hierarchical diagram of navigation control information with respect to a sensor input, according to an example embodiment.

A hierarchical diagram of navigation control information with respect to the sensor input may be expressed as FIG. 27.

Figure 10:
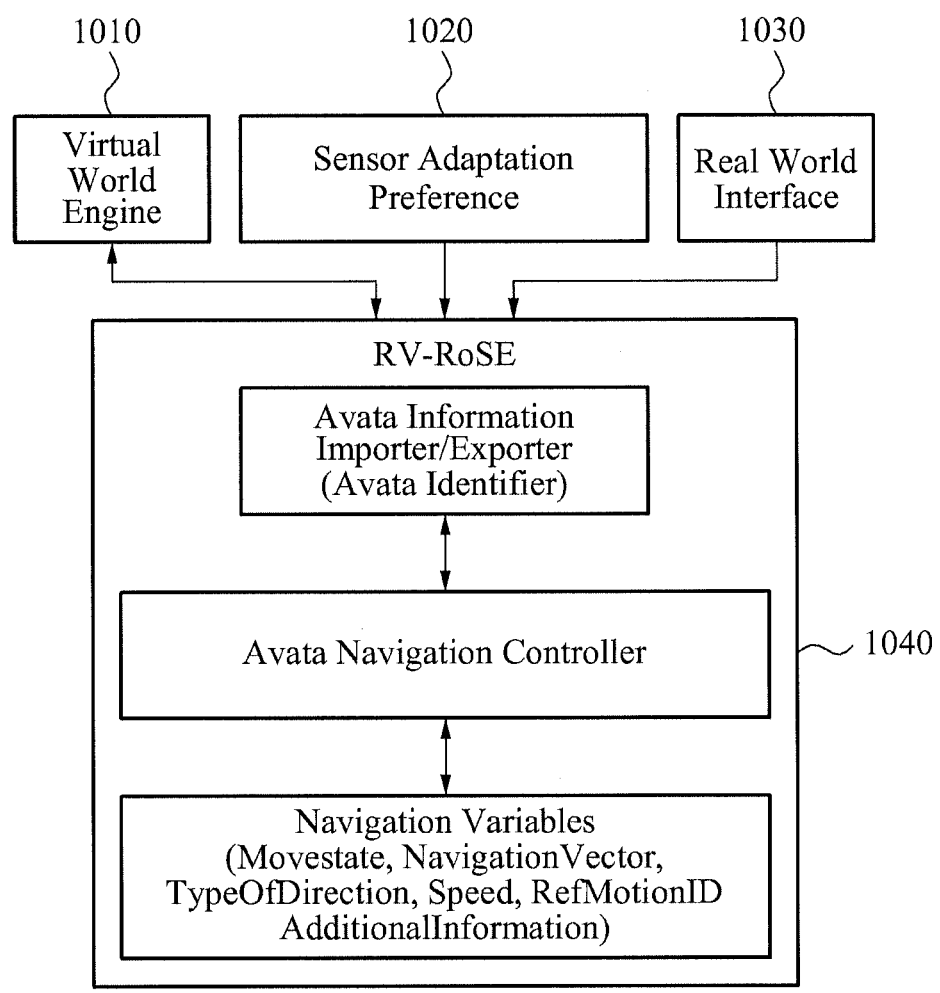
FIG. 10 illustrates a diagram describing an avatar navigation process in association with an RV-RoSE engine, according to an example embodiment.

FIG. 10 illustrates a diagram describing an avatar navigation process in association with an RV-RoSE engine 1040, according to an example embodiment.

Referring to FIG. 10, the whole system may include a virtual world engine 1010, a real world interface 1030, a sensor adaptation preference 1020, and the RV-RoSE engine 1040.

The virtual world engine 1010 is a system for connection with the virtual world such as SECOND LIFE. The real world interface 1030 refers to a terminal enabling a user to control the virtual world. The sensor adaptation preference 1020 may add an intention of the user, for example, adjustment of a range of data values.

When the user selects an avatar through various versions of the real world interface 1030, ID information of the selected avatar may be input to an importer of the RV-RoSE engine 1040. Additionally, navigation information is input to a sub navigation variable through an avatar navigation controller. When the user modifies a navigation value through various types of the real world interface 1030, the avatar navigation controller of the RV-RoSE engine 1040 adjusts and stores a value of a corresponding variable. Next, the modified navigation value of the avatar may be transmitted to the virtual world engine 1010 through an avatar information exporter.

<Virtual Element Schema>

1. VE

Figure 28:
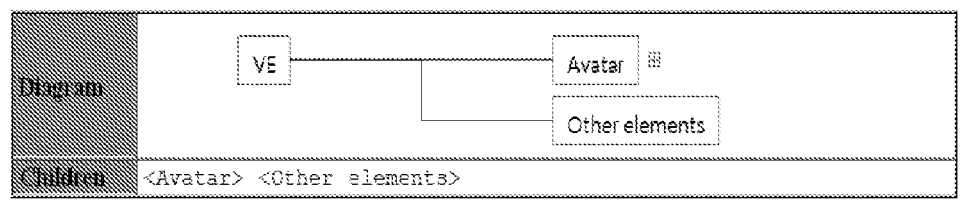
FIG. 28 illustrates Syntax, according to an example embodiment.

VE is a basic element of virtual elements.
   syntax is shown in FIG. 28.
   semantics is shown in FIG. 29.

2. Avatar

Figure 30:
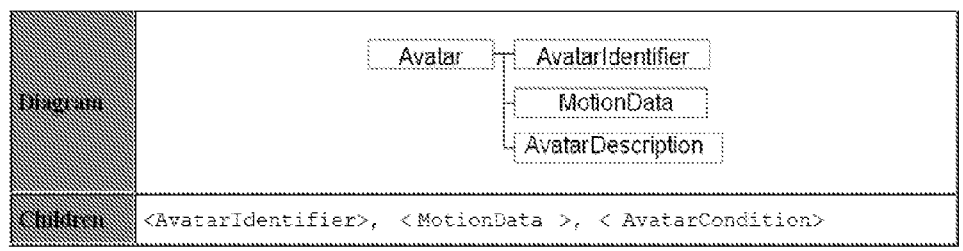
FIG. 30 illustrates Syntax, according to an example embodiment.

Avatar contains information on all parameters applicable to characteristics of the avatar.
   syntax is shown in FIG. 30.
   semantics is shown in FIG. 31.

3. AvatarIdentifier

Figure 32:
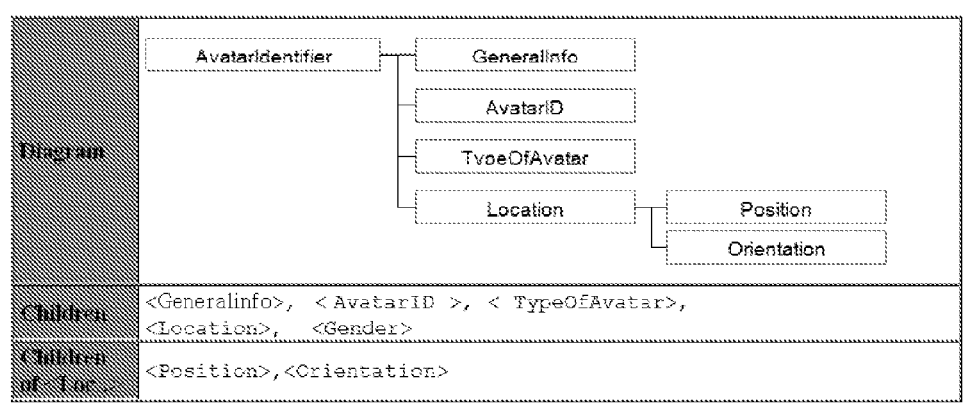
FIG. 32 illustrates Syntax, according to an example embodiment.

AvatarIdentifier contains a specific type of information on avatar identification.
   syntax is shown in FIG. 32.
   semantics is shown in FIG. 33.

4. AvatarMotionData

Figure 34:
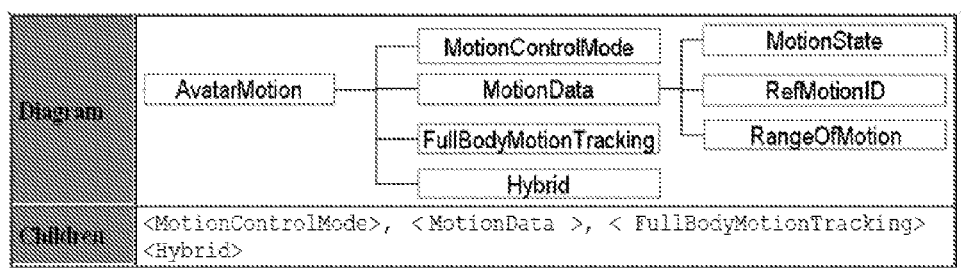
FIG. 34 illustrates Syntax, according to an example embodiment.

AvatarMotionData contains a specific type of information on an avatar motion.
   syntax is shown in FIG. 34.
   semantics is shown in FIG. 35.

5. AvatarCondition

Figure 36:
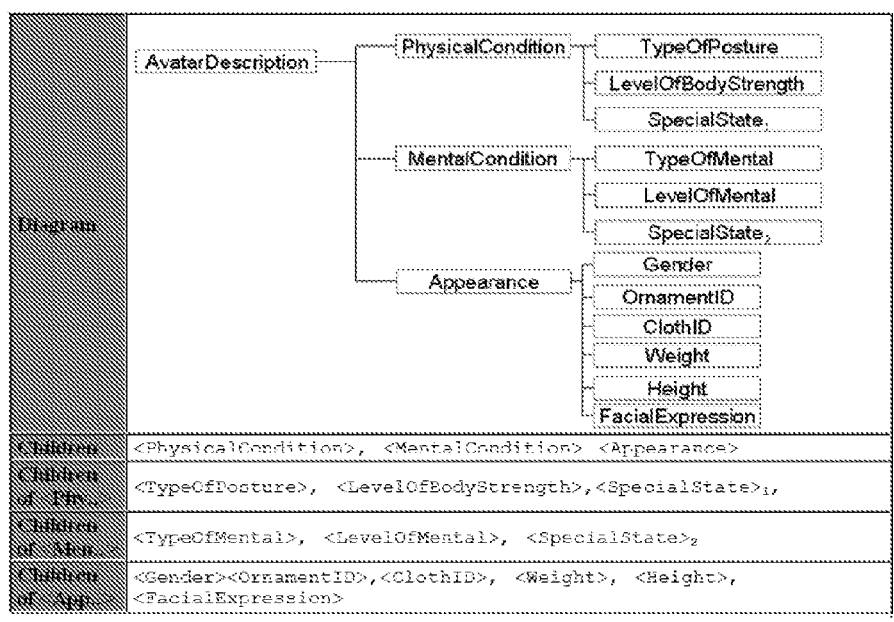
FIG. 36 illustrates Syntax, according to an example embodiment.

AvatarCondition contains a specific type of condition information of the avatar. AvatarCondition includes PhysicalCondition and MentalCondition.
   syntax is shown in FIG. 36.
   semantics is shown in FIG. 37.

<Navigation Control Schema>

1. Navigation

Figure 38:
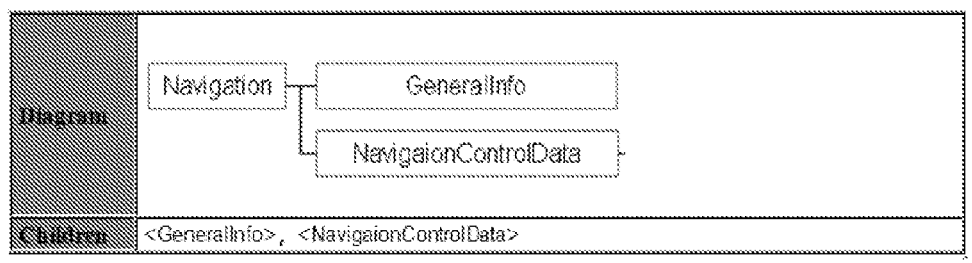
FIG. 38 illustrates Syntax, according to an example embodiment.

Navigation contains information on all control parameters and contextual states of the control parameters.
   syntax is shown in FIG. 38.

2. NavigationDescription

Figure 40:
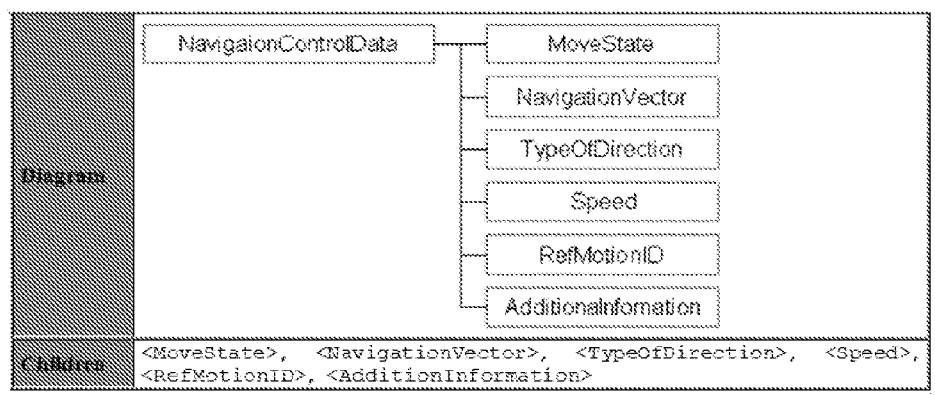
FIG. 40 illustrates Syntax, according to an example embodiment.

NavigationDescription contains information for an initial navigation state.
   syntax is shown in FIG. 40.
   semantics is shown in FIG. 41.

As described above, a motion in the real world may be effectively reflected to manipulation of a virtual object of the virtual world by modeling an object for manipulation of the virtual object and suggesting object operation schema.

In addition, an avatar in the virtual world may be effectively navigated by defining a physical condition and a mental condition of the avatar and setting motion data of the avatar.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard discs, floppy disks, and magnetic tape; optical media such as CD RQM disks and DVDs; magneto-optical media such as optical disks; and hardware devices that are specially configured to store and perform program instructions, such as read-only memory (RQM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on a computer-readable media, e.g., a non-transitory or persistent computer-readable medium. The program/software implementing the embodiments may also be transmitted over a transmission communication path, e.g., a network implemented via hardware. Examples of the non-transitory or persistent computer-readable media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An object manipulation device comprising:
a processor configured to:
import an object identifier from a virtual world engine based on an predefined object model, wherein the predefined object model defines that the object identifier comprises an object state and an modifiable attributes, wherein the object state comprises available status, selected status, and unavailable status, and wherein the modifiable attributes comprise available status and unavailable status;
import an object information from the virtual world engine based on the predefined object model, wherein the predefined object model further defines that the object information comprises spatial attributes, physical attributes, and temporal attributes;
manipulate the object information by modifying, removing, restoring, or combining at least one of the spatial attributes, the physical attributes, and the temporal attributes; and
export the manipulated object information to the virtual world engine; wherein the processor is further configured to:
receive a first sensor input command from a sensor, wherein the first sensor input command corresponds to a selecting operation; import the object identifier, based on the first sensor input command; check the object state from the imported object identifier to determine whether the object state has an available status, a selected status, or an unavailable status; responsive to the object state having an available status, set the object state to indicate a selected status; import the object information; receive a second sensor input command from the sensor, wherein the second sensor input command corresponds to manipulating operation; check the modifiable attributes from the imported object identifier to determine whether the modifiable attributes has an available status or an unavailable status; and responsive to the modifiable attributes having indicate an available status, manipulate the object information based on the second sensor input command, and export the manipulated object information.

2. The object manipulation device of claim 1, wherein: the spatial attributes comprise shape, location, and size;
the physical attributes comprise tactile, pressure or force, vibration, and temperature; and
the temporal attributes comprise duration, and motion.

3. The object manipulation device of claim 1, wherein, if the object state indicates an unavailable status, the processor is further configured not to perform the selecting operation; and if the modifiable attributes indicate an unavailable status, the processor is further configured not to perform the manipulating operation.

* * * * *